R. L. KILPATRICK.
CULTIVATOR.
APPLICATION FILED APR. 5, 1909.
951,950.
Patented Mar. 15, 1910.
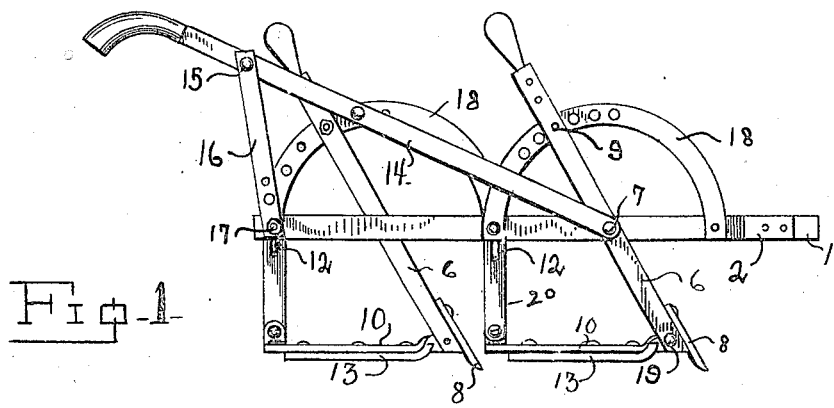
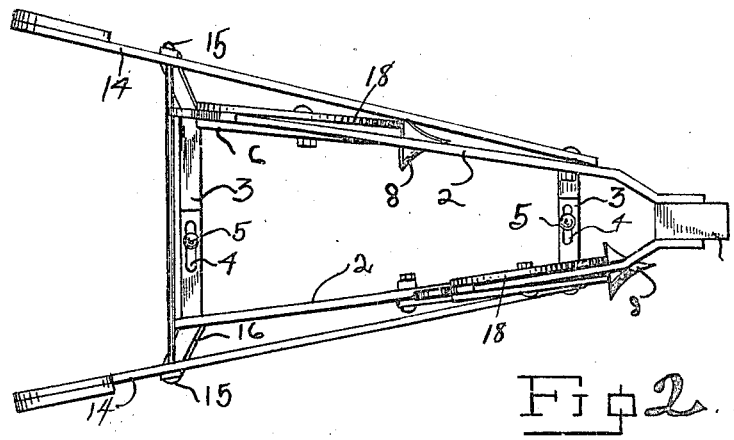
WITNESSES:
INVENTOR
Robert L. Kilpatrick
BY
Edward V. Hardway
ATTORNEY

UNITED STATES PATENT OFFICE.

ROBERT L. KILPATRICK, OF HEMPSTEAD, TEXAS, ASSIGNOR OF ONE-FOURTH TO S. A. GARRETT AND ONE-FOURTH TO H. P. GARRETT, BOTH OF HEMPSTEAD, TEXAS.

CULTIVATOR.

951,950.

Specification of Letters Patent. Patented Mar. 15, 1910.

Application filed April 5, 1909. Serial No. 487,853.

*To all whom it may concern:*

Be it known that I, ROBERT L. KILPATRICK, a citizen of the United States, residing at Hempstead, in the county of Waller and State of Texas, have invented certain new and useful Improvements in Cultivators, of which the following is a specification.

My invention relates to new and useful improvements in cultivators and more particularly to that class of such implements as are designed to be used in the cultivation of crops which are planted in rows.

The object of the invention is to provide a cultivator of the class described that is capable of adjustment so that the depth of the furrows as well as their distance apart can be readily controlled by the operator.

Another feature resides in the provision of means for withdrawing the plows entirely from the ground when it is desired to move the cultivator from one place of operation to another.

A still further feature resides in the provision of means for the longitudinal adjustment of the shares on the cultivator frame.

Finally the object of the invention is to provide a device of the character described that will be strong, durable, light and easily handled, and one that will be easily and inexpensively constructed and kept in repair.

With the above and other objects in view, my invention has particular relation to certain novel features of construction and operation an example of which is given in this specification and illustrated in the accompanying drawings, wherein:—

Figure 1 is a side elevation of my device, and Fig. 2 is a plan view of the same.

Referring, now, more particularly to the drawings, wherein like numerals of reference designate similar parts in each of the figures, the numeral 1 refers to the beam of the cultivator, to which side bars 2 are attached by bolts or other suitable means. A plurality of cross bars 3 are attached to each of the side bars, and are oppositely disposed to each other, and extend inwardly, overlapping one another. These cross-bars are provided with oblong longitudinal slots 4 through which bolts 5 are passed. These bolts carry nuts which may be tightened and the cross-bars thus held firmly together at any desired point of adjustment. The lateral adjustment of the cultivator is thus provided for. Suitable, vertically disposed, stocks 6, of iron or other suitable material, are pivotally mounted upon said side bars, one upon each, at the point 7. The lower ends of these stocks carry shares 8, adjustably mounted thereon, while the upper or free end is prolonged into a handle which operates as a lever for the adjustment of the pitch of the share point. These stocks are held in place, at any point of adjustment, by means of bolts which pass through holes in said stocks and also through holes which register therewith, in the arcuate members 18 secured to the side bars 2. These arcuate members are each provided with a number of holes, each of which may be made to register with the holes in stocks 6 and thus various points of adjustment are provided for. Near the lower end of each of the stocks a keel or runner 10 is hingedly attached. This runner extends rearwardly and serves as the main support for the cultivator frame. Uprights 20 are hingedly attached to the rear end of these runners and also have a vertically slidable connection 19 with the side bars 2. This slidable connection is accomplished by reason of a longitudinal slot 12, in said uprights, through which a bolt passes, said bolt also passing through a hole in the side bars, alined with said slot 12. By the raising and lowering of these uprights, the pitch of the share points may, to an extent, be determined. Underneath this runner 10, a plate 13 is secured. I have also provided handles 14 which are secured to the side bars 2 at the point 7 and the rear ends of which are supported by braces 16 secured to the said handles at the point 15 and to the side bars 2 at 17. These braces are provided with a plurality of vertically alined holes for the vertical adjustment of the handles.

It is obvious that by a rearward pull on the handle of stock 6 the front end of the stock as well as the front end of runner 10 and the share carried thereby will be elevated and the share withdrawn from the ground. The stock may then be secured in this position, in the manner hereinbefore set forth, and the cultivator may readily be transported from place to place the implement sliding on the heel of runner 10.

What I claim is:—

1. In a device of the character described, a supporting frame including a main beam and a plurality of side beams extending rearwardly therefrom, a stock pivoted to each of said side beams, a share carried by each of the stocks, an arcuate member also carried by each of said side beams and having an adjustable connection with the upper end of the stock whereby the inclination of the stock with reference to the side beam may be regulated, runners for supporting said stocks, upright supports for holding said runners in their proper position and means for the vertical adjustment of the said supports.

2. In a device of the character described, a supporting frame including a main beam and a plurality of laterally adjustable side beams extending rearwardly therefrom, a stock pivoted to said side beams, a share carried by each of the stocks, means also carried by each of said side beams and having an adjustable connection with the upper end of the stock whereby the inclination of the stock with reference to the side beam may be regulated, runners for supporting said stocks, upright supports for holding said runners in their proper position and means for vertical adjustment of said supports.

In testimony whereof I have signed my name to this specification in the presence of two subscribing witnesses.

ROBERT L. KILPATRICK.

In the presence of—
E. C. GUY,
WM. A. CATHEY.